(No Model.) 2 Sheets—Sheet 1.

L. J. R. HOLST.
PHOTOGRAPHIC FINDER.

No. 587,056. Patented July 27, 1897.

Witnesses:
J. D. Kingsbury
G. C. Shinn.

Inventor:
Lodewyk Jan Rutger Holst
By Whitaker & Prevost, Attys.

THE NORRIS PETERS CO., PHOTO-LITHO., WASHINGTON, D. C.

(No Model.) 2 Sheets—Sheet 2.

L. J. R. HOLST.
PHOTOGRAPHIC FINDER.

No. 587,056. Patented July 27, 1897.

Witnesses.
J. D. Kingsbury
G. C. Shinn

Inventor:
Lodewyk Jan Rutger Holst
By Whitaker & Prevost attys.

UNITED STATES PATENT OFFICE.

LODEWYK JAN RUTGER HOLST, OF AMSTERDAM, NETHERLANDS.

PHOTOGRAPHIC FINDER.

SPECIFICATION forming part of Letters Patent No. 587,056, dated July 27, 1897.

Application filed January 12, 1897. Serial No. 618,987. (No model.)

*To all whom it may concern:*

Be it known that I, LODEWYK JAN RUTGER HOLST, a subject of the Queen of Holland, residing at Amsterdam, Holland, have invented new and useful Improvements in Photographic Finders, of which the following is a specification.

My invention relates to photographic cameras of the kind in which a view-finder is arranged which shows the view of the full size of the picture to be produced upon a screen fixed in the top of the camera.

In cameras of this kind there is a certain amount of difficulty in focusing when the camera is placed at the height of the eyes, and when making an upright picture the operator stands facing in a direction at right angles to the direction of the object to be photographed.

The object of the present invention is to provide means whereby the camera can be focused from a position level with the eyes and in which the operator always looks at the picture with the face toward the object being photographed.

According to my invention I use a mirror inside the camera and also the ground-glass screen, on which the image is thrown, as hitherto, but I combine with the lid which serves to cover the ground-glass screen a mirror upon which the image thrown upon the screen can be reflected.

To enable my invention to be fully understood, I will describe the same by reference to the accompanying drawings, in which—

Figure 1:
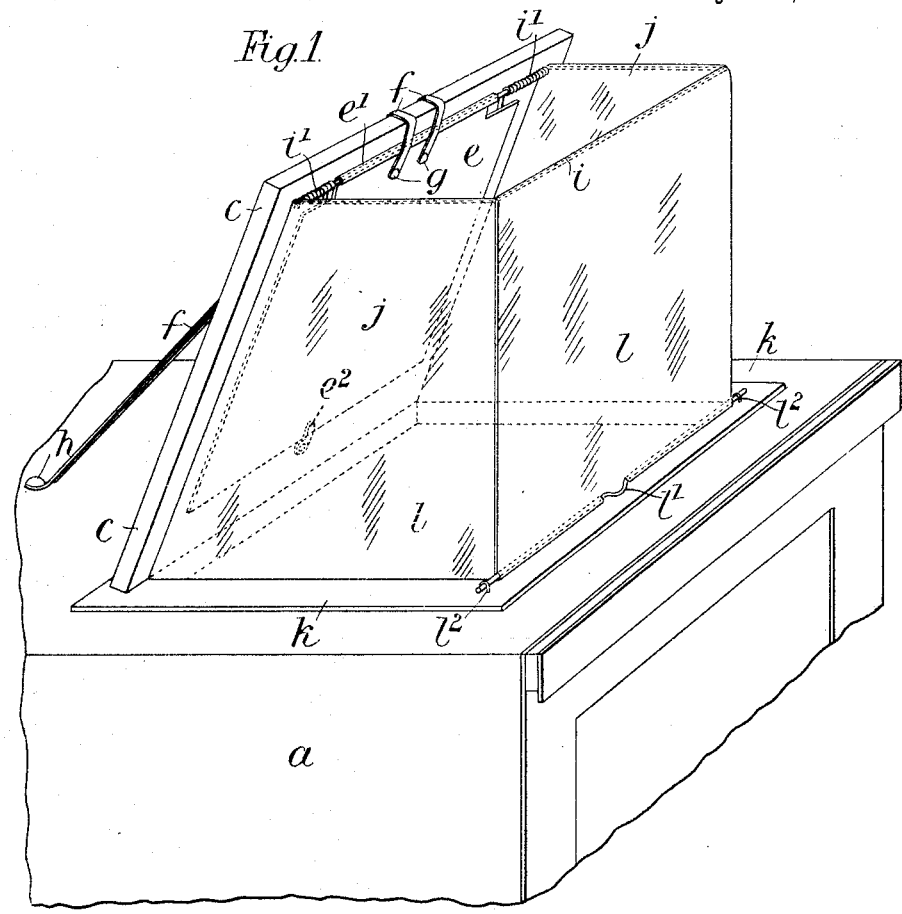
Figure 2:
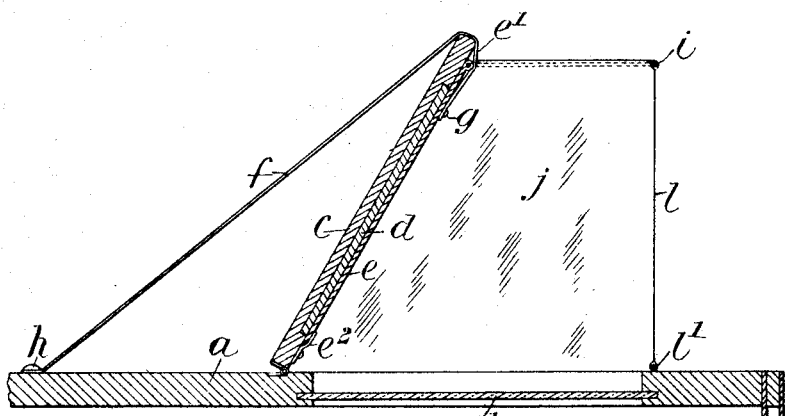
Figure 3:
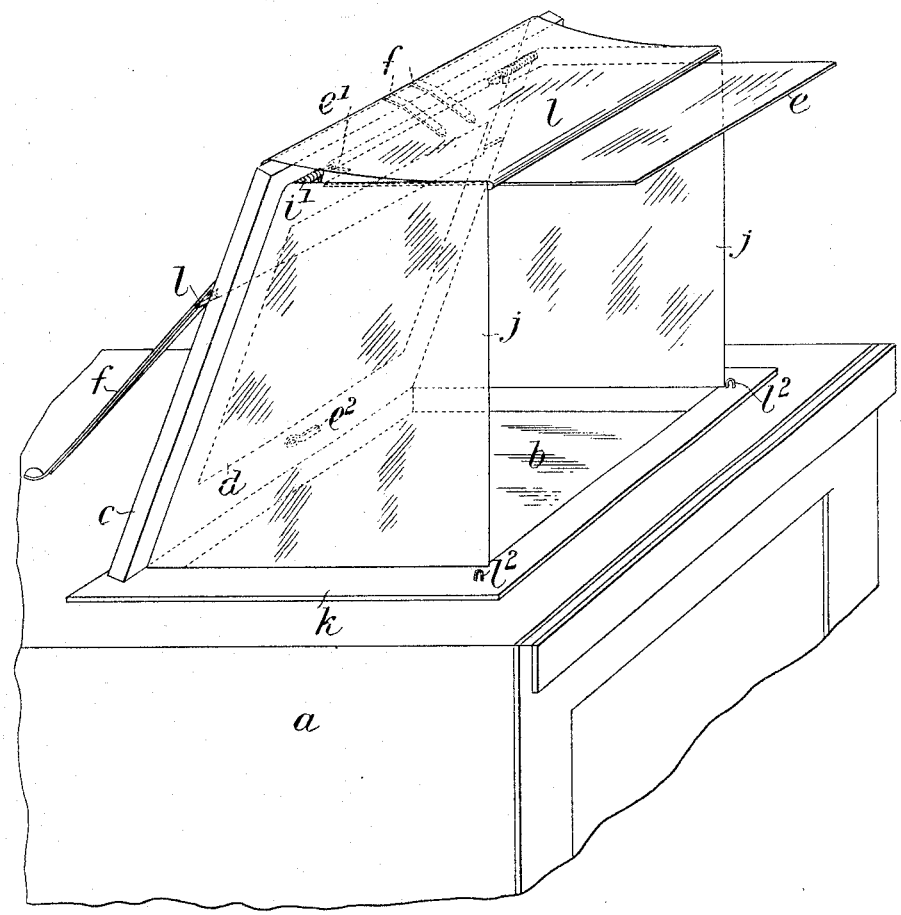

Figure 1 is a perspective view of the upper part of a camera having my improvements applied thereto, and Fig. 2 is a longitudinal section of the same. Fig. 3 is a view showing the position of the parts when using my invention.

$a$ is the camera-box of ordinary construction.

$b$ is the ground-glass screen in the top of the said box, upon which the image is reflected in the usual manner, and $c$ is the lid or cover, which serves to close the opening in which the ground-glass screen $b$ is mounted.

$d$ is the mirror, arranged according to my invention, and which I fix on the inner side of the lid $c$ in such a manner that when the said lid is turned up to the desired angle and the mirror is uncovered the image cast upon the screen $b$ will be reflected onto it.

$e$ is a cover (preferably made of metal) which is hinged at $e'$ to the lid $c$, and which closes down onto the mirror $d$ to cover the same when it is not required for use, as shown in Figs. 1 and 2.

$f$ is an india-rubber band or spring attached at one end to the cover $e$ at $g$ (for a purpose hereinafter described) and at the other end to the camera-box at $h$, the said spring, when the lid $c$ is closed down over the screen $b$, being in tension, whereby when the lid is lifted it will be retained in position by the said spring.

$i$ is a wire frame having at its ends springs $i'$ $i'$, coiled around the pin of the hinge $e'$ in such a manner that while on the one hand the frame $i$ can be turned down to lie flat upon the cover $e$ on the other hand the normal tendency of the said springs will be to move the said frame away from the said cover in order that when the lid $c$ is opened upward, as shown in Fig. 1, the said spring-frame will stretch taut pieces of fabric $j\,j$, which at their upper edges are secured to the sides of the frame $i$ and at their lower edges fixed to the top of the camera-box by strips $k\,k$.

To the rear part of the frame $i$ is attached another piece of fabric $l$, which hangs like a curtain to close the opening between the two side pieces of fabric $j\,j$, the said curtain having at its lower edge a bar or rod $l'$, the ends of which are designed to be inserted into eyes or staples $l^2\,l^2$ to retain the said curtain in position. These pieces of fabric $j\,j$ and $l$ and the cover $e$ form, with the lid $c$, the hood, which serves to cut off the light from the screen $b$ when focusing, and it is to be understood that when the camera is not in use these parts, together with the spring-frame $i$, are turned down, so as to lie in a recess formed between the lid $c$ and the screen $b$, a suitable catch being provided for holding the said hood down against the pull of the said spring $f$. When it is desired to use the camera, the said catch is released, so that the spring $f$ raises the lid $c$, and at the same time the spring-frame $i$ rises to stretch the pieces of fabric $j\,j$ and $l$—that is to say, the parts move to the position shown in Fig. 1, which is the position of the parts when the camera is to be focused by the direct inspection of the picture reflected onto the screen $b$ in the usual manner. If, however, it is desired to focus by the inspection of the picture on the mirror $d$, the rod $l'$ of the curtain $l$ is disconnected from the eyes $l^2\ l^2$, and the said curtain is thrown back over the top of the hood, as shown in Fig. 3, and a small turnbuckle $e^2$ on the lid $c$ is turned, so as to allow the spring $f$, which, as before stated, is connected to the cover $e$, to pull the said cover to a horizontal position also, as shown in Fig. 3. When the parts are in this position, it will be obvious that the image produced upon the screen $b$ will be seen reflected upon the mirror $d$, which reflection can be seen whether the photographic plate is to be used for a horizontal or a vertical picture.

It is obvious that the elastic band $f$ can be replaced by a spring inserted in the hinge of the lid $c$. In this case a second spring is arranged at the top of the lid $c$ to raise the metal inner lid $e$, Fig. 3.

Although I have described my invention as applied to a camera in which the view-finder is arranged in conjunction with the ordinary camera-box, it is to be understood that my invention is also applicable to a camera known as a "twin" camera, in which a second lens similar to the working lens is used to produce an image on the finder for focusing purposes.

Having now particularly described and ascertained the nature of my said invention and in what manner the same is to be performed, I declare that what I claim is—

1. A photographic camera provided with a view-finder having a stationary ground-glass screen, on the upper side of the camera-body, a cover for said screen, a mirror secured to the under side of said cover, adapted to reflect the image on the ground-glass screen horizontally and an additional cover for said mirror whereby said view-finder may be used with or without said mirror, substantially as described.

2. A photographic camera provided with a view-finder having a stationary ground-glass screen on the upper side of the camera-body, a hinged cover for said screen, a mirror permanently secured to the lower side of the said cover and a spring for elevating and supporting said cover and mirror in position to reflect the image on the ground glass horizontally, substantially as described.

3. A photographic camera provided with a view-finder having a stationary ground-glass screen on the upper side of the camera-body, a hinged cover for said screen, a mirror secured to the lower side of said cover, and a cover for said mirror hinged to the upper end of said screen-cover and adapted when raised to form a shield for said mirror, substantially as described.

4. A photographic camera provided with a view-finder having a stationary ground-glass screen on the upper side of the camera-body, a cover for said screen provided with a mirror on its under side and a cover for said mirror hinged to the said screen-cover adjacent to its outer end and provided with means for holding it in position to serve as a shield for said mirror, substantially as described.

5. A photographic camera provided with a view-finder having a stationary ground-glass screen on the upper side of the camera-body, a cover for said screen, a folding frame secured to said cover provided with side portions adapted with said cover to surround said screen when the cover is raised, substantially as described.

6. A photographic camera provided with a view-finder having a stationary ground-glass screen on the upper side of the camera-body, a hinged cover for said screen, a mirror on the under side of said cover, a mirror-cover hinged to the screen-cover adjacent to its outer end, a folding frame secured to said screen-cover having side walls and a removable front wall forming a shield for the ground glass, the mirror-cover adapted to form the top of said shield when open, substantially as described.

7. A photographic camera provided with a view-finder having a stationary ground-glass screen on the upper side of the camera-body, a hinged cover for said screen, a mirror on the under side of said cover, a cover for said mirror hinged to said screen-cover at its outer end, an elastic strap secured at one end to said mirror-cover and to the camera-body, means for securing the mirror-cover in closed position and means for securing the screen-cover in closed position whereby said strap will support both the screen and mirror cover in operative positions, substantially as described.

LODEWYK JAN RUTGER HOLST.

Witnesses:
PATRICK JOHN MCGRATH,
AUGUST SIEGFRIED DOCEN.